March 23, 1965    W. H. PERRY, JR    3,174,566
WARNING RANGE ATTACHMENT FOR SCALE INDICATORS
Filed Dec. 30, 1963
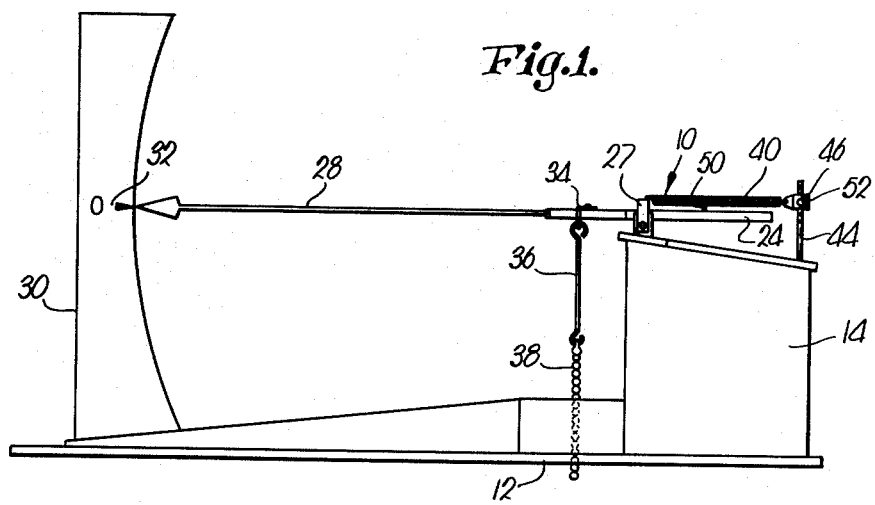
Fig.1.
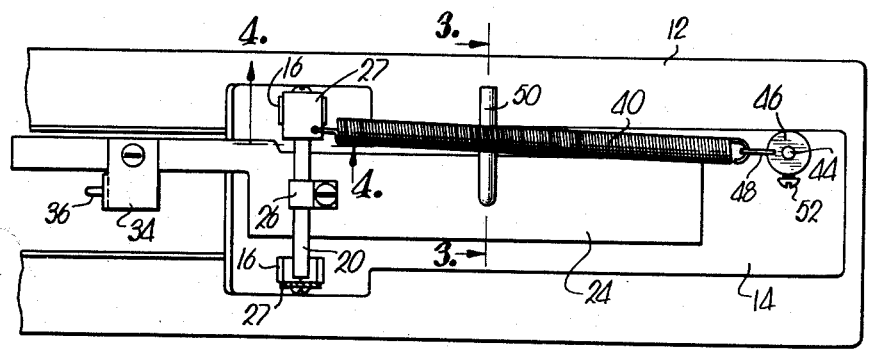
Fig.2.
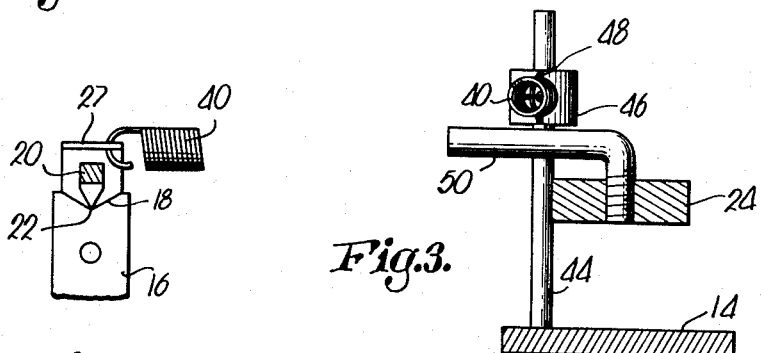
Fig.3.
Fig.4.
INVENTOR.
William H. Perry Jr.
BY
Hovey, Schmidt, Johnson & Hovey
ATTORNEYS

United States Patent Office 3,174,566
Patented Mar. 23, 1965

3,174,566
WARNING RANGE ATTACHMENT FOR
SCALE INDICATORS
William H. Perry, Jr., Webb City, Mo., assignor to
Cardinal Scale Manufacturing Co., Webb City, Mo., a
corporation of Missouri
Filed Dec. 30, 1963, Ser. No. 334,191
2 Claims. (Cl. 177—166)

This invention relates to indicators for weighing apparatus, and more particularly, to mechanism for giving advance warning of attaining a predetermined load on the apparatus.

For particular applications such as measuring predetermined quantities of material by weight, the weighing apparatus may include an indicator remote from the weighing beam which swings responsive to the weight of the material being placed on the apparatus. One position of the indicator corresponds with an accumulation of a predetermined amount of material on the apparatus and this position may conveniently be marked by suitable indicia in alignment with the indicator in this "zero balance" position.

The indicator is pivoted to swing by gravity and is coupled through a flexible element with the main scale beam for holding the beam against said swinging movement until material is placed on the main scale. As the main scale beam is swung responsive to the weight of material thereon, the element slackens to allow the indicator to swing to an extent permitted by the element for accurately reflecting the position of the main scale beam and, hence, the weight of material on the scale.

In batch-weighing operations, for example, where a quantity of material may be dumped on the apparatus in a relatively short length of time, it is desirable that the operator of the apparatus have advance warning of the accumulation of the desired amount of material on the scales so that the flow of material may be interrupted in time to prevent an over-accumulation of material.

The static inertia of the indicator arm operates to prevent an immediate response of the arm to the application of weight on the main scale, resulting in a delay between the actual accumulation of the predetermined amount of material on the scale and the indication of the attainment of such accumulation by the indicator.

Efforts have heretofore been made to avoid this delay by utilizing springs connected directly to the indicator for biasing the latter in a direction to keep the flexible element connecting the indicator and the scale beam taut at all times. The springs operate to overcome the static inertia of the indicator and insure immediate response thereof when weight is applied to the main scale.

Although these springs have been successful in preventing inertial lag and permit early warning of the approach of an accumulation of the desired quantity of material, there have been certain disadvantages which have been encountered through their use. Primarily, the force of the springs acts in conjunction with the weight of the material to swing the indicator, resulting in inaccuracies in the readings available from the apparatus. Further, the use of apparatus utilizing springs which affect the readings thereof in certain application of the apparatus has been proscribed by state and federal laws.

Accordingly, it is the most important object of the instant invention to provide a scale indicator capable of giving advance warning of the accumulation of the desired amount of material on the scales without affecting the accuracy of the reading when the proper loading of the scales is attained.

Another important object of the invention is to provide weighing apparatus capable of achieving the foregoing object and which is constructed in conformity with existing state and federal laws.

Still a further object of this invention is to provide early warning indicator apparatus constructed of a minimum of parts and which may be quickly and easily installed as an attachment to existing weighing apparatus.

Yet another object of the invention is to provide an early warning attachment for a scale indicator which is automatically engaged with the indicator when the scale does not have the desired amount of weight thereon, but which automatically becomes disengaged with the indicator when the latter reaches a zero-balance position.

Still other important objects and advantages of the instant invention will be pointed out or become apparent as the specification continues.

In the drawing:
FIGURE 1 is a side elevational view of a scale indicator with an early warning attachment embodying the principles of this invention;
FIG. 2 is a fragmentary plan view on an enlarged scale of the indicator of FIG. 1;
FIG. 3 is a vertical, cross-sectional view taken along line 3—3 of FIG. 2; and
FIG. 4 is a fragmentary, vertical, cross-sectional view taken along line 4—4 of FIG. 2.

The scale indicator apparatus chosen for illustration is broadly designated 10 and comprises a base 12 having an upright support 14 secured thereto proximal one end of base 12. Support 14 has a pair of upright, opposed, horizontally spaced standards 16 thereon, each standard 16 having a V-shaped notch 18 presenting an agate bearing in the upper surface of the standard. A bar 20 extends between the standards 16 and has a knife edge 22 received in the notches 18 to provide a fulcrum for an indicator beam 24 which is secured to bar 20 by a bracket 26 on the upper surface of beam 24. An L-shaped retainer 27 for each standard 16 maintains bar 20 in position on the notches 18.

Beam 24 is so configured that the greater mass of the beam lies on one side of fulcrum bar 20 causing the beam 24 to be urged to rotate about the fulcrum 20 by gravity. A pointer 28 extends in longitudinal alignment with beam 24 and terminates proximal an upright dial plate 30. A suitable index 32 on plate 30 may indicate a predetermined position of beam 24.

A bracket 34 secured to beam 24 on the opposite side of fulcrum 20 from the greater mass of beam 24, receives a fastener 36 for securing a flexible element such as a chain 38 to beam 24. It will be understood that the other end of chain 38 is suitably coupled to components such as the main beam of weighing apparatus (not shown), whereby the indicator beam 24 is held against the action of gravity by the sheer weight of the main scale components to a position of beam 24 with pointer 28 disposed below index 32. When sufficient material has been placed on the main scale apparatus to cause the elevating of the main scale beam, element 38 is thereby released to permit beam 24 to rotate in a clockwise direction (as shown in FIG. 1) under the influence of gravity.

Index 32 is placed on plate 30 in disposition to be aligned with pointer 28 when beam 24 is in a position corresponding to the zero-balance position of the main scale beam which occurs when a predetermined weight of material has been placed on the main weighing apparatus. It will be understood that beam 24 is held in this zero-balance position by element 38.

Since beam 24 is held in disposition with pointer 28 disposed below index 32 until sufficient material has accumulated on the weighing apparatus to cause the main scale beam to rise, indicator beam 24 cannot move until just before the accumulation on the weighing apparatus has reached the desired weight. If the operator who controls the flow of material onto the weighing apparatus is to have sufficient advance warning of the desired accumulation in order to be able to halt the flow of material onto the apparatus, it is extremely important that pointer 28 be immediately responsive to the movement of the main scale beam. However, the static inertia of beam 24 and pointer 28 is such that there is an appreciable time lag between the release of the hold-down force on beam 24 exerting through chain 38 and the subsequent rotation of beam 24 on fulcrum 20 by gravity. This time lag is sufficiently great that by the time pointer 28 reaches the zero-balance position, an accumulation of material on the main weighing apparatus may have exceeded the desired amount.

In order to alleviate this time lag, an attachment is provided for the indicator apparatus to insure an immediate response by overcoming the static inertia of the swingable beam 24 and pointer 28. Accordingly, a resilient member, which may be a helical spring 40, is provided for operating to urge the beam 24 toward the zero-balance position. Spring 40 has one end thereof secured to one of the standards 16 by attachment to the corresponding L-shaped retainer 27. The other end of member 40 is secured to an upright post 44 on support 14 by a collar 46. A link 48 attaches collar 46 to member 40.

An L-shaped arm 50 has one leg thereof threadably secured to beam 24 and extends in disposition beneath member 40 whereby arm 50 engages the latter when beam 24 is in disposition with pointer 28 held beneath the zero-balance condition by the main scale apparatus. Thus, as the main scale beam releases the hold-down force on beam 24, spring 40 acts against arm 50 to urge beam 24 to rotate in a clockwise direction as viewed in FIG. 1, immediately upon the release of the hold-down force. Thus, there is no time lag between the release of the hold-down force and the swinging of beam 24 and pointer 28 toward the zero-balance position. This insures that pointer 28 signifies the approach of the accumulation of the desired amount of material on the main weighing apparatus sufficiently in advance to permit the operator to regulate the flow of material accordingly.

It is extremely important, however, that the spring 40 not be in position for influencing the disposition of beam 24 and pointer 28 when they are actually in the zero-balance position. This position must be achieved and maintained solely by the weight of the material on the weighing apparatus in order that the reading accurately reflect the proper weight of the material. Accordingly, collar 46 may be adjusted vertically on post 44 and secured by an adjusting screw 52 whereby spring 40 is out of engagement with arm 50 when beam 24 is in the zero-balance position.

It will be noted from the drawing that spring 40 is disposed substantially parallel to beam 24 when the latter is in this position. Thus, arm 50 automatically engages spring 40 by causing the latter to yield as beam 24 is rotated in a counter-clockwise position as viewed in FIG. 1, through the hold-down force on chain 38. The spring 40 is thereby automatically moved to its extended position and remains in such position constantly exerting a force on beam 24 which urges the latter toward the zero-balance position. This insures instantaneous response at the moment the hold-down force on chain 38 is released. The force of spring 40 on beam 24 is automatically released, however, when the latter has swung to a position thereof approaching the zero-balance position, the force of the spring being automatically disengaged to avoid adversely affecting the reading of the indicator apparatus. This insures the measuring of the correct amounts of material by the weighing apparatus and also complies with state and federal laws and regulations which prohibit auxiliary springs which may affect the readings for certain applications.

Having thus described the invention, what is claimed as new and desired to be secured by Letters Patent is:

1. In an indicator for a scale comprising a support, an indicator beam pivoted on the support intermediate the ends of the beam for rotation about a horizontal axis spaced horizontally from the center of gravity of said beam, and a flexible element secured to the beam at a location spaced horizontally from said axis and adapted to be coupled with the scale for swinging the beam about said axis only after weight is placed on the scale, there being a position of said beam indicating a predetermined accumulation of said weight, the combination with said indicator of:

a motivator for said beam comprising an arm rigidly carried by the beam for movement with the latter;

a pair of spaced supports adjacent the beam on either side of the arm; and an elongated, resilient member secured to each support and extending therebetween in disposition to be engaged by said arm throughout a portion of the swinging movement of the beam, said member being out of engagement with the arm when the beam is in said position corresponding to the predetermined accumulation of weight.

2. An indicator as set forth in claim 1 wherein said resilient member includes a helical spring.

References Cited by the Examiner
UNITED STATES PATENTS

| | | | |
|---|---|---|---|
| 1,018,173 | 2/12 | Dunn | 177—194 |
| 1,712,767 | 5/29 | Johnson | 177—46 |
| 1,885,356 | 11/32 | Karrer | 177—194 |
| 2,009,020 | 7/35 | Flanagan | 177—46 |

LEYLAND M. MARTIN, *Primary Examiner.*

LEO SMILOW, *Examiner.*